(12) United States Patent
Awaji

(10) Patent No.: US 7,103,658 B2
(45) Date of Patent: Sep. 5, 2006

(54) RENDERING CALCULATION PROCESSING STATUS MONITORING PROGRAM, AND STORAGE MEDIUM, APPARATUS, AND METHOD THEREFOR

(75) Inventor: Tetsuhiko Awaji, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 733 days.

(21) Appl. No.: 10/029,801

(22) Filed: Dec. 31, 2001

(65) Prior Publication Data

US 2003/0055904 A1    Mar. 20, 2003

(30) Foreign Application Priority Data

Sep. 4, 2001    (JP)    ............... 2001-267195

(51) Int. Cl.
*G06F 15/16*    (2006.01)
(52) U.S. Cl. ................ 709/224; 714/38; 714/57
(58) Field of Classification Search ........... 709/224; 702/182, 183, 186; 700/26; 714/38, 57
See application file for complete search history.

(56) References Cited

U.S. PATENT DOCUMENTS

| | | | | |
|---|---|---|---|---|
| 5,764,228 A * | 6/1998 | Baldwin | ............ | 715/797 |
| 5,796,633 A * | 8/1998 | Burgess et al. | ............ | 702/187 |
| 5,838,906 A * | 11/1998 | Doyle et al. | ............ | 709/202 |
| 5,999,187 A * | 12/1999 | Dehmlow et al. | ............ | 345/420 |
| 6,064,391 A * | 5/2000 | Sano et al. | ............ | 345/424 |
| 6,088,041 A * | 7/2000 | Ballard et al. | ............ | 345/467 |
| 6,184,888 B1 * | 2/2001 | Yuasa et al. | ............ | 345/419 |
| 6,249,836 B1 | 6/2001 | Downs et al. | | |
| 6,313,838 B1 * | 11/2001 | Deering | ............ | 345/420 |
| 6,351,724 B1 * | 2/2002 | Klassen et al. | ............ | 702/186 |
| 6,369,910 B1 * | 4/2002 | Mitani | ............ | 358/1.17 |
| 6,405,327 B1 * | 6/2002 | Sipple et al. | ............ | 714/39 |
| 6,446,070 B1 * | 9/2002 | Arnold et al. | ............ | 707/10 |
| 6,454,071 B1 * | 9/2002 | Peter et al. | ............ | 192/69.9 |
| 6,615,090 B1 * | 9/2003 | Blevins et al. | ............ | 700/26 |
| 6,654,915 B1 * | 11/2003 | Lu et al. | ............ | 714/57 |
| 6,681,331 B1 * | 1/2004 | Munson et al. | ............ | 713/201 |
| 6,754,854 B1 * | 6/2004 | Kurrasch | ............ | 714/47 |
| 6,789,046 B1 * | 9/2004 | Murstein et al. | ............ | 702/182 |
| 6,859,898 B1 * | 2/2005 | Yamashita et al. | ............ | 714/55 |
| 6,937,244 B1 * | 8/2005 | Hong | ............ | 345/544 |
| 2001/0056308 A1 * | 12/2001 | Petrov et al. | ............ | 700/98 |
| 2002/0140710 A1 * | 10/2002 | Fliflet | ............ | 345/660 |
| 2003/0055904 A1 * | 3/2003 | Awaji | ............ | 709/206 |
| 2003/0067483 A1 * | 4/2003 | Harris | ............ | 345/745 |

FOREIGN PATENT DOCUMENTS

| | | | |
|---|---|---|---|
| JP | HEI 6-214903 A | 8/1994 | |
| JP | 2000-20197 A | 1/2000 | |

* cited by examiner

*Primary Examiner*—Andrew Caldwell
*Assistant Examiner*—Stephan Willett
(74) *Attorney, Agent, or Firm*—Staas & Halsey LLP

(57) ABSTRACT

Information on a calculation progress status output based on rendering software is managed in an information record file. At the same time, identification information from a user that shows a desirable output processing is managed. When a rendering processing in the same rendering file has been calculated again by changing only a specific parameter, this processing is compared with the past processing transition that has produced a desirable processing result. Based on this, a satisfactory or non-satisfactory result of execution is decided. When there is a problem, this is notified to the user by electronic mail.

14 Claims, 13 Drawing Sheets

FIG.5

```
> Rendering ID: 013
> User and Host: watanabe on Host-A
> Start time: 2001.06.20 21:36
> Renderer: NormalRender
> Project: ProjectA
> RenderData: /usr/wata/data/rnd02
> Resolution: 720 x 486
> AntiAliasLevel: 3
> SubDivisionLevel: 2
> MotionBlurLevel: 2
> BackFaceCull: 0
> ShadowLevel: 3
> Reflection: 2
> Refraction: 2
> Frames: 1 to 3600 by 2
> Output file: /usr/wata/img/rnd02
Now rendering --> 123 / 1800
Latest memory --> 98,320 (kb)
Total time --> 02d08h13m28s
Average time --> 00h24m13s
Latest time --> 00h19m28s
Rest time --> 03d19h51m
```
~500

FIG.6

```
To: rndobsrv@mail.fujitsu.com
Sub: CHK RND STAT
===============================
USR: watanabe
PSWD: 0529
RENDERING ID: 013
RTNID: 09012345678@phone.ne.jp
FILE: attach
```
~600

FIG.7

```
To: 09012345678@phone.ne.jp
Sub: Render status of watanabe
```
> Rendering ID: 013
> User and Host: watanabe on Host-A
> Start time: 2001.06.20 21:36
> Renderer: NormalRender
> Project: ProjectA
> RenderData: /usr/wata/data/rnd02
> Resolution: 800 x 600
> AntiAliasLevel: 3
> SubDivisionLevel: 1
> MotionBlurLevel: 3
> BackFaceCull: 0
> ShadowLevel: 1
> Refrection: 3
> Refraction: 2
> Frames: 1 to 3600 by 2
> Output file: /usr/wata/img/rnd02
Now rendering --> 123 / 1800
Latest memory --> 98,320 (kb)
Total time --> 02d08h13m28s
Average time --> 00h24m13s
Latest time --> 00h19m28s
Rest time --> 03d19h51m File --> attached

```
To: 09087654321@phone.ne.jp
Sub: Rendering Time Alarm
```
This is an alert mail for your rendering.

Your rendering ID [013] on [Host-A] deviate from expected rendering time curve on frame [122].

You changed following parameters after the last rendering.
-ResolutionX [640] → [800]
-ResolutionY [480] → [600]
-AntiAliasLevel [2] → [3]
-SubDivisionLevel [2] → [1]
-MotionBlurLevel [1] → [3]
-BackFaceCull [1] → [0]
-ShadowLevel [2] → [1]
-Refrection [2] → [3]

Most probable parameter you need to change might be
 [MotionBlurLevel].

And, you better check
 [Refrection],
 [AntiAliasLevel],
 [ResolutionX],
 [ResolutionY],
 [BackFaceCull].

800

FIG.9
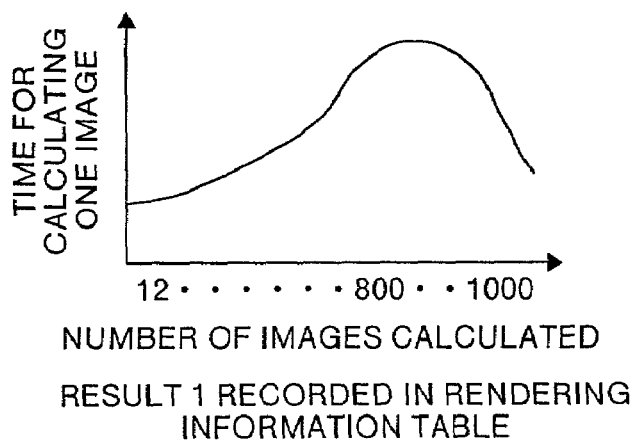
RESULT 1 RECORDED IN RENDERING
INFORMATION TABLE
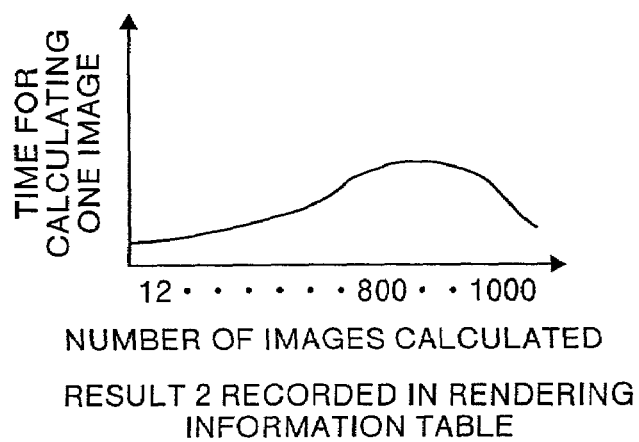
RESULT 2 RECORDED IN RENDERING
INFORMATION TABLE
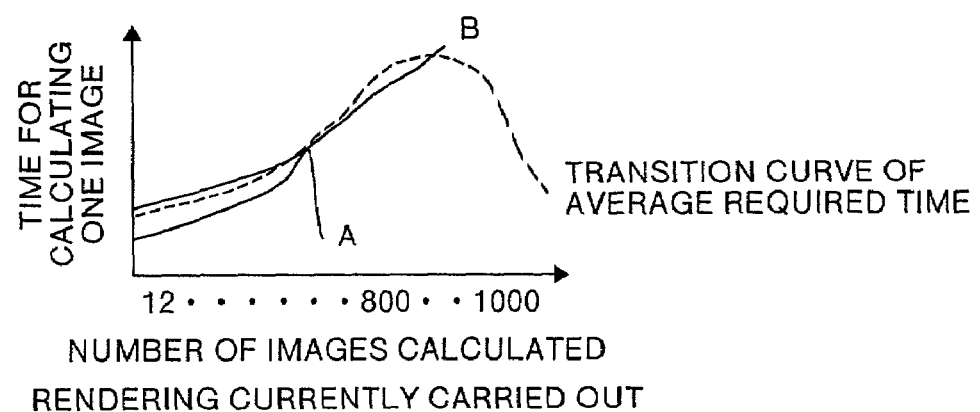
RENDERING CURRENTLY CARRIED OUT

FIG.11

| RENDERING IDENTIFIER 1101 | USER 1102 | RENDERING FILE 1103 | RENDERING INFORMATION RECORD FILE 1104 | RENDERING IMAGE FILE 1105 | REFERENCE FLAG 1106 |
|---|---|---|---|---|---|
| 001 | Watanabe | /usr/wata/data/rnd01 | /global/rnd_check/wata01052900 | /usr/wata/img/rnd01 | 0 |
| 002 | Watanabe | /usr/wata/data/rnd02 | /global/rnd_check/wata01052901 | /usr/wata/img/rnd02 | 1 |
| 004 | Aoki | /usr/aoki/data/test01 | /global/rnd_check/aoki01052900 | /usr/aoki/img/test01 | 0 |
| 008 | Watanabe | /usr/wata/data/rnd02 | /global/rnd_check/wata01060300 | /usr/wata/img/rnd02 | 1 |
| 009 | Tanaka | /usr/tnk/data/tnk001 | /global/rnd_check/tanaka01060300 | /usr/tnk/img/tnk001 | 1 |
| 010 | Satoh | /usr/sato/data/rend_tst | /global/rnd_check/sato01060500 | /usr/sato/img/rend_tst | 0 |
| 012 | Tanaka | /usr/tnk/data/tnk001 | /global/rnd_check/tanaka01062000 | /usr/tnk/img/tnk001b | 1 |
| 013 | Watanabe | /usr/wata/data/rnd02 | /global/rnd_check/wata01062000 | /usr/wata/img/rnd02 | 1 |
| 014 | Watanabe | /usr/wata/data/rnd03 | /global/rnd_check/wata01062001 | /usr/wata/img/rnd03 | 1 |

| FRAME NUMBER | AVERAGE TIME Tb | INCREASE OR DECREASE IN PROCESSING TIME Tb' | AVERAGE OF NEAREST TEN FRAMES Ta | INCREASE OR DECREASE IN PROCESSING TIME Ta' |
|---|---|---|---|---|
| 1 | 0h08m02s | ** | ** | ** |
| 2 | 0h08m09s | +7 | ** | ** |
| 3 | 0h08m42s | +33 | ** | ** |
| 4 | 0h09m13s | +31 | ** | ** |
| 5 | 0h09m39s | +26 | ** | ** |
| .. | .. | .. | .. | .. |
| 119 | 0h14m02s | +17 | 0h13m00s | +12 |
| 120 | 0h14m14s | +12 | 0h13m15s | +15 |
| 121 | 0h14m36s | +22 | 0h13m22s | +7 |
| 122 | 0h15m00s | +24 | 0h10m53s | −149 |
| 123 | 0h15m06s | +6 | CALCULATING | |
| 206 | 0h15m11s | +5 | | |
| 207 | 0h15m03s | −8 | | |
| 208 | 0h14m58s | −5 | | |
| 209 | 0h14m50s | −8 | | |
| 210 | 0h14m22s | −28 | | |
| .. | .. | .. | .. | .. |
| 238 | 0h06m46s | −16 | | |
| 239 | 0h06m32s | −14 | | |
| 240 | 0h06m11s | −21 | | |

FIG.14

| PARAMETER | RELATION WITH CALCULATION TIME |
|---|---|
| Resolution X | 1 |
| Resolution Y | 1 |
| AntiAliasLevel | 1 |
| SubDivisionLevel | 1 |
| MotionBlurLevel | 1 |
| BackFaceCull | −1 |
| ShadowLevel | 1 |
| Refrection | 1 |
| Refraction | 1 |

FIG.15

| PARAMETER | CURRENT VALUE | NEAREST VALUE | DIFFERENCE | "RELATION WITH CALCULATION TIME" × "DIFFERENCE FLAG" | AVERAGE | VARIANCE | ABSOLUTE VALUE OF (CURRENT VALUE - AVERAGE) | ABSOLUTE VALUE/ VARIANCE |
|---|---|---|---|---|---|---|---|---|
| ResolutionX | 800 | 640 | 1 | 1 | 544.0 | 576.0 | 256.0 | 0.444 |
| ResolutionY | 600 | 480 | 1 | 1 | 408.0 | 432.0 | 192.0 | 0.444 |
| AntiAliasLevel | 3 | 2 | 1 | 1 | 1.6 | 2.4 | 1.4 | 0.583 |
| SubDivisionLevel | 1 | 2 | −1 | −1 | 2.0 | 2.0 | 1.0 | 0.500 |
| MotionBlurLevel | 3 | 1 | 1 | 1 | 0.2 | 1.6 | 2.8 | 1.750 |
| BackFaceCull | 0 | 1 | −1 | −1 | 0.4 | 2.4 | 0.4 | 0.167 |
| ShadowLevel | 1 | 2 | −1 | −1 | 1.6 | 2.4 | 0.6 | 0.250 |
| Refrection | 3 | 2 | 1 | 1 | 1.2 | 1.6 | 1.8 | 1.125 |
| Refraction | 2 | 2 | 0 | 0 | 1.2 | 1.6 | 0.8 | 0.500 |

RENDERING CALCULATION PROCESSING STATUS MONITORING PROGRAM, AND STORAGE MEDIUM, APPARATUS, AND METHOD THEREFOR

FIELD OF THE INVENTION

The present invention relates to a rendering calculation processing status monitoring program for monitoring a progress status of a rendering calculation processing and for notifying a monitoring status to a user, a storage medium, an apparatus, and a method therefor.

BACKGROUND OF THE INVENTION

A scientific technical calculation for carrying out a simulation and an image generation calculation according to computer graphics (this kind of processing is called a rendering calculation) require a very long time to execute these processing. It is not rare that it takes a few days to execute a rendering calculation processing. Therefore, based on an estimated progress status, an operator needs to visit a machine room to confirm the progress status of the calculation processing in front of a computer console screen, on holidays, only for the purpose of this confirmation.

Further, in the case of executing a processing based on a distributed processing by a plurality of computers, it is necessary to confirm the progress status of each computer individually in front of each console screen.

In order to reduce the load of this confirmation work, there have been devised methods of using an electronic mail to receive a notification of an end of a started rendering calculation.

For example, Japanese Patent Application Laid-open Publication No. 6-214903 discloses a method of automatically notifying a distinction between a normal end and an abnormal end of a result of executing a job to a designated destination by electronic mail, or outputting a result of the execution to a designated output unit, upon finishing the execution of the job by a computer system.

Further, JP-A No. 2000-20197 discloses a method of displaying on a user terminal a current processing status or how much more time is necessary to execute the processing according to a busy status of a server side, based on a request from a user terminal to the server unit which carries out an information search processing via the Internet.

Usually, in the case of carrying out a rendering calculation, basic information on a shape of an object and a position of a light source as well as various parameters are set up in order to give a feel of the material in forming an image. Based on these parameters, it becomes possible to give various feels of the material to an image that is to be formed by rendering calculation.

However, as an ideal result of an output of a prepared image becomes different depending on an image that the user has, it is impossible to fix firm proper parameters in advance. Therefore, in order to obtain an ideal image at one time, the user leaves the basic information on the rendering as it is, and changes only parameters and repeats executing the rendering processing many times. Then, by comparing the results of the execution, the user gradually finds proper parameter set values.

Because of this work style, even when a rendering calculation ends simply on the computer as a normal end, the long work time taken for this processing becomes useless if the parameter set values have a problem and this gives an execution result having a different image from what the user has expected.

It is necessary for the user to catch as quickly as possible whether the current processing can produce a desirable result that has been obtained in the past or not in comparison with the past processing that produced this satisfactory result, during the execution of the processing, rather than to know whether the whole processing has ended or not.

Further, when it is anticipated that it is not possible to obtain a desirable execution result, it is necessary to analyze which parameter correction brings about the unsatisfactory result. When a user is away from a terminal that executes the rendering processing, the user must return to the execution terminal to analyze this problem, and the user cannot investigate the problem to improve the processing during the moving time. Therefore, although there is no parameter set value fixed for the rendering processing, it is necessary to find immediately the reference information showing a parameter set value that gives the worst result.

However, according to the conventional techniques, only an execution result is notified to a user at the point of time when a processing (job) executed by a computer system has ended. Further, according to the convention techniques, only an estimated time required for ending the job is notified to the user.

SUMMARY OF THE INVENTION

It is an object of the present invention to make it possible to forecast whether a rendering calculation processing (job) executed by a computer can output a desirable execution result or not, and notify this forecast to a user, during the execution of the processing.

Further, it is an other object of the present invention to make it possible to identify a necessary correction point and notify this to a user, when it has been forecast that a rendering calculation processing currently under execution is not possible t o produce a desirable execution result.

According to one aspect of the present invention, there are provided a rendering calculation processing status monitoring program, and a storage medium, a monitoring apparatus, and a method therefor, having the following characteristics. Information on a calculation progress status output based on a plurality of rendering software is managed in a predetermined information record file. At the same time, identification information from a user that shows a desirable output processing is managed. When a rendering processing in the same rendering file has been calculated again by changing only a specific parameter, this processing is compared with a past processing transition that has output a desirable image, and a transition of a calculation processing time is monitored. Based on this, a satisfactory or non-satisfactory result of execution is automatically decided. When a decision has been made that there is a problem, this is notified to the user by electronic mail.

Further, according to another aspect of the present invention, there are provided a rendering calculation processing status monitoring program, and a storage medium, a monitoring apparatus, and a method therefor, having the following characteristics. Whether a change of a parameter to a constant direction works to increase or decrease a calculation time is managed in advance. When a rendering processing has been decided to have a problem, a parameter that has a set value different from that of the same nearest processing registered as a desirable processing and that coincides with a direction of increasing or decreasing the problem processing time, is identified. Further, parameters that have been set to the furthest values from a variance of parameter values set in the past are sequentially selected as candidate parameters to be corrected, and these are notified to the user.

FIG. 9 shows an outline method of deciding a satisfactory or non-satisfactory execution result according to the aspects of the present invention. By analyzing calculation time transition data of an information record file according to a processing registered as a desirable processing, it becomes possible to know a trend of a preferable calculation time transition for a processing to be executed.

Assume, for example, that two past processing cases are registered as desirable for calculating 1,000 continuous images, and that these two cases have data in an information record file as shown in graphs of "a result 1 recorded in a rendering information table" and "a result 2 recorded in a rendering information table" as shown in FIG. 9.

The two cases are considered to have been carried out by changing parameters. From the data of these two cases, it is understood that there is a trend of increase in the calculation time as the calculation proceeds. With a peak at around the 800-th image (or frame), the processing time becomes shorter, and the processing of the last image ends with a calculation time that is about the same as that required for the first image.

Accordingly, a rendering calculation processing status monitoring program according to the aspects of the present invention can assume calculation time transition data that becomes a reference as a preferable processing, based on the data of the two cases. Then, a calculation time transition of the processing currently under execution is always compared with this reference transition.

In FIG. 9, "a rendering calculation currently under execution" is a conceptual diagram for comparing a transition of the current time with the reference transition. Processing A shows a reduction in the calculation time at considerably an earlier timing than an estimated timing, and the calculation time is suddenly shortened. On the other hand, processing B shows a continuous increase in the calculation time even at the timing when the calculation time is expected to become shorter. Both cases have a possibility that generated continuous images become different from what the user wants. Therefore, the status monitoring program can issue an alarm to the user.

Other objects and features of this invention will become understood from the following description with reference to the accompanying drawings.

BRIEF DESCRIPTION OF THE DRAWINGS

FIG. 5 is a diagram showing a rendering information record file;

FIG. 6 is a diagram showing a status confirmation mail;

FIG. 7 is a diagram showing a status notification mail;

FIG. 8 is a diagram showing an abnormal-processing alarm mail;

FIG. 9 shows conceptual diagrams for monitoring a rendering processing;

FIG. 11 is a diagram showing a rendering information table;

FIG. 13 is a diagram showing a calculation time decision table;

FIG. 14 is a diagram showing a parameter calculation time relation table; and

FIG. 15 is a diagram showing a correction parameter table.

DETAILED DESCRIPTIONS

Embodiments of the present invention will be explained in detail below with reference to the drawings.

Figure 1:
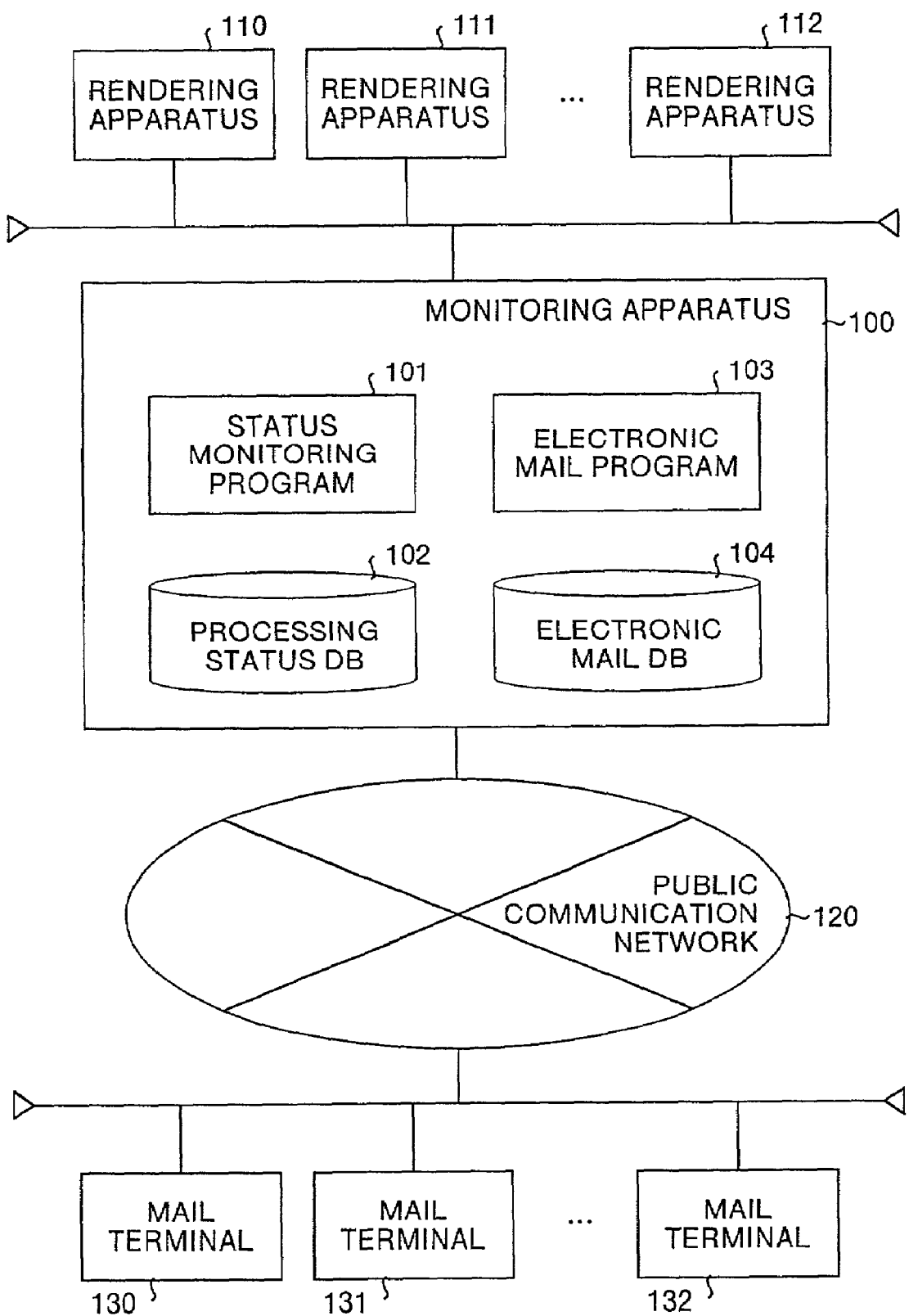
FIG. 1 is a diagram showing a conceptual structure of the present invention.

FIG. 1 shows a system structure diagram of the present invention. The present invention is constructed of rendering apparatuses 110, 111, and 112 for occasionally notifying a processing status of a rendering calculation to a monitoring apparatus 100, the monitoring apparatus 100 for monitoring each status of rendering processing, and notifying the processing status by electronic mail, mail terminals 130, 131, and 132 for requesting the monitoring apparatus 100 to notify a processing status, and receiving a processing status from the monitoring apparatus 100, and a public communication network 120 for connecting the monitoring apparatus 100 to the mail terminals 130, 131, and 132.

The monitoring apparatus 100 is further constructed of a status monitoring program 101 for deciding a rendering processing status from the rendering apparatuses 110 to 112 and deciding whether there is an abnormal status or not, notifying an abnormal status by mail when there is the abnormal status, and notifying a current processing status by mail at the request from the mail terminals 130 to 132, a processing status DB (Database) 102 for the status monitoring program 101 to refer to and write into it in order to execute the above processing, an electronic mail program 103 for executing electronic mail exchanges with the mail terminals 130 to 132, and an electronic mail DB 104 for the electronic mail program 103 to refer to and write into it in order to execute the above processing.

The rendering apparatuses 110, 111, and 112 are workstations or high-functional personal computers that can execute high-speed processing suitable for a rendering processing. The mail terminals 130, 131, and 132 are portable telephones, PDAs (personal data assistants), or notebook-type personal computers that can transmit and receive electronic mails. The public communication network 120 is the Internet network, for example, that can execute digital data communications.

Figure 2:
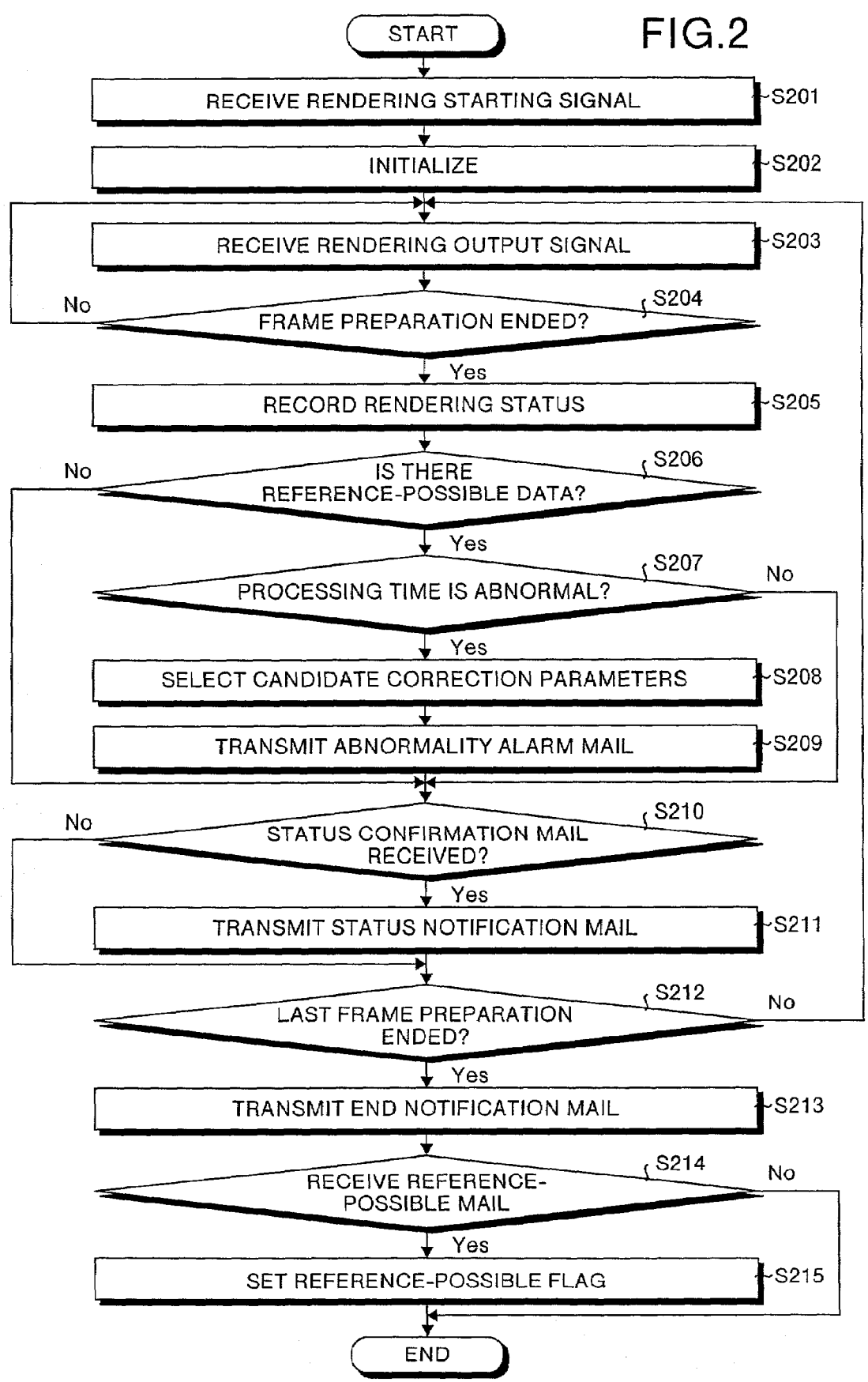
FIG. 2 is a total processing flowchart of the present invention.

FIG. 2 is a processing flowchart showing a total processing flow of the present invention. At step S201, the status monitoring program 101 receives messages from the rendering apparatuses 110 to 112 that they have started a rendering processing respectively. The received signals include various kinds of information such as an identifier of a rendering processing that is being executed, and parameter values that are being used. Based on this information, the status monitoring program 101 prepares a rendering information record file as shown in FIG. 5.

This rendering information record file is recorded with, for example, an identifier of a started rendering processing (Rendering ID in FIG. 5), a user and a processing unit (User and Host), a processing starting time (Start time), a processing program (Renderer), a project name (Project), a rendering file name (Render Data), various kids of parameter set values according to the processing (from Resolution to Refraction) and a rendering image file (Output file) that is output.

Thereafter, the information contents of the rendering information record file are added and updated each time when the rendering information record file has received information that shows a completion of the rendering calculation of one frame from the rendering apparatuses 110 to 112. At this time, in addition to the above information, there are added and updated, for example, a number of frames currently under processing (Now rendering in FIG. 5), a latest memory capacity used (Latest memory) a total time from the start of the processing (Total time), an average processing time per one frame (Average time), a latest processing time for completing the processing of a frame (Latest time), and an estimated required time until the completion (Rest time).

At step S202, the status monitoring program 101 sets initial values to a rendering information table 1100, a rendering time table 1200, a calculation time decision table 1300, a parameter calculation time relation table 1400, and a correction parameter table 1500 respectively.

Roles of these tables and methods of setting the initial values will be explained below.

First, the status monitoring program 101 registers a new rendering processing into the rendering information table 1100 as shown in FIG. 11. The rendering information table 1100 has an object of managing the presence of relevant files, and specifying a past processing to be referred to at the time of processing the same rendering file again.

The rendering information table 1110 is composed of a "rendering identifier" 1101 that is allotted to each rendering processing, a "user" name 1102 for whom the processing has been executed, a "rendering file name" 1103 of a file that has been executed, a "rendering information record file name" 1104 that is recorded with a processing status of each one frame from the start of the processing, a "rendering image file name" 1105 of a rendering image file that has been generated, and a "reference flag" 1106 for identifying whether this processing is to be referred to later or not. At step S202, all the information other than the information on the reference flag 1106 are registered based on notified information from the rendering apparatuses 110 to 112.

Figure 12:
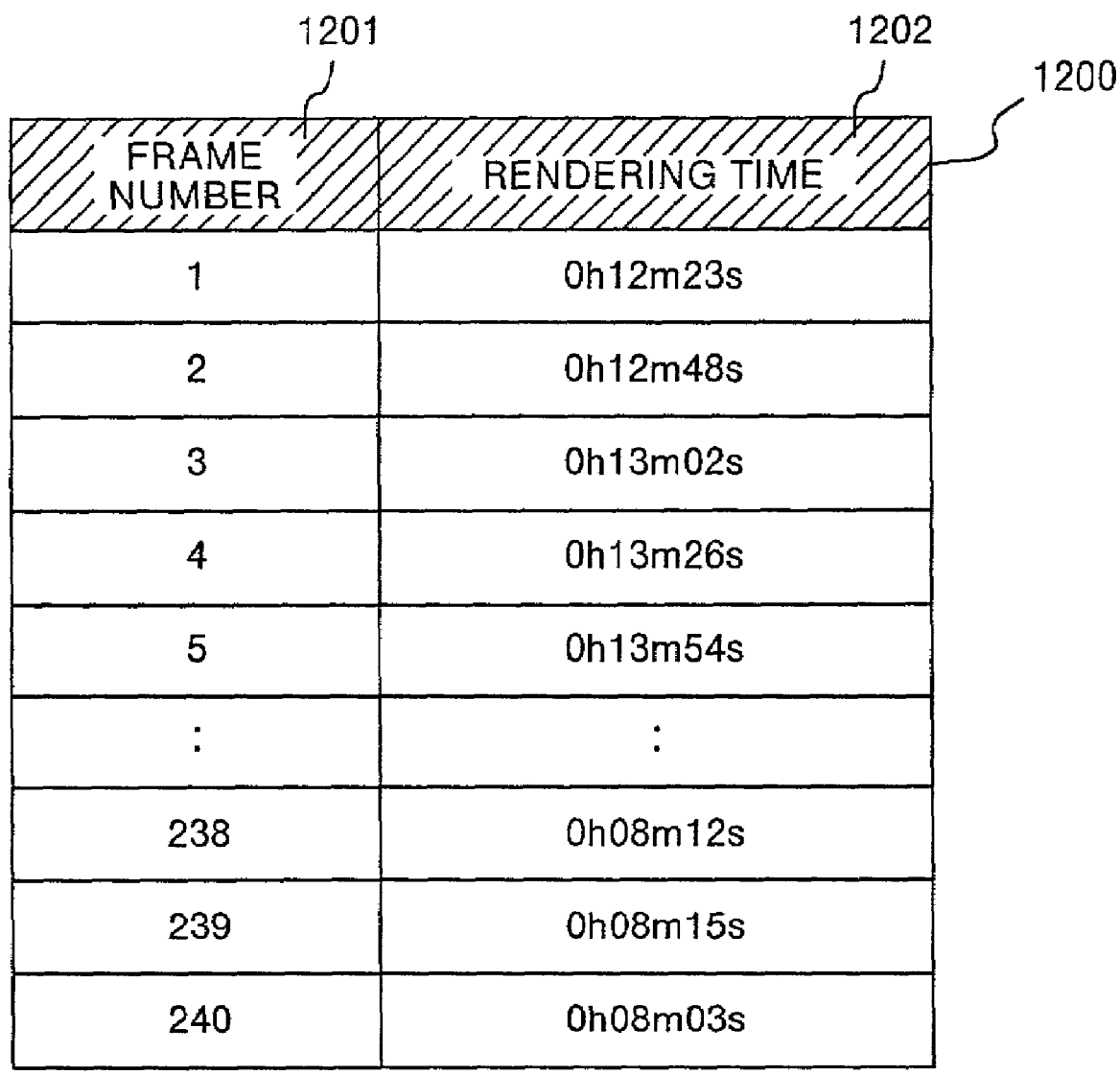
FIG. 12 is a diagram showing a processing time table.

In the initial setting at step S202, the status monitoring program 101 next generates the processing time table 1200 as shown in FIG. 12. The processing time table 1200 is generated for each "rendering identifier" 1101, and has an object of recording a "rendering processing time" 1202 for each "frame" 1201.

Further, at step S202, the status monitoring program 101 generates the calculation time decision table 1300 as shown in FIG. 13. The calculation time decision table 1300 is generated for each "rendering identifier" 1101. This is a table to be utilized for monitoring for each frame whether or not the progress status of a processing currently carried out is different from a reference calculation transition that has been obtained from the past same rendering processing as a reference.

The status monitoring program 101 extracts all the processing time tables 1200 that correspond to the rendering identifiers 1101 having valid "reference flags" 1106 ("1" in the example of FIG. 11) in the rendering files of the same "rendering file names" 1103 that have been newly registered in the rendering information table 1100. The status monitoring program 101 calculates an average processing time for each frame and writes a calculated result into "average processing time" 1302. Further, the status monitoring program 101 calculates an increase or decrease in the processing time as compared with a processing time of the frame immediately before, and writes a calculated result into "increase or decrease in the processing time" 1303. The "increase or decrease in the processing time" 1303 is not recorded for a first frame, as it is not possible to calculate this for the first frame.

However, when there is no corresponding rendering identifier 1101, the status monitoring program 101 may not generate the calculation time decision table 1300.

Further, at step S202, the status monitoring program 101 sets the parameter calculation time relation table 1400 as shown in FIG. 14. The parameter calculation time relation table 1400 may be set in advance. When a decision has been made that the progress status of a rendering processing currently under execution is different from the reference transition, the parameter calculation time relation table 1400 becomes a first reference table for finding a parameter which has caused this difference. In this parameter calculation time relation table 1400, it is set whether an increase in each parameter value works to increase (+) the rendering calculation time or decrease (−) the rendering calculation time. It is theoretically possible to catch this work direction in advance. In the example shown in FIG. 14, when a parameter works to increase (+) the "relation with the calculation time" 1402, this parameter is set to "1". When a parameter works to decrease (−) the "relation with the calculation time" 1402, this parameter is set to "−1". When a parameter does not work either to increase or decrease, this parameter is set to "0".

Parameters 1401 are various kinds of variables that are used for executing a rendering processing. The variables used in FIG. 14 will be explained as follows. "Resolution" means resolution, "AntiAliasLevel" means precision of smoothly drawing a slanted line, "SubDivisionLevel" means precision of smoothly approximating a curve, "MotionBlurLevel" means a degree of animation afterimage, "BackFaceCull" means a degree of displaying a back surface of an object, "ShadowLevel" means a degree of expressing a shadow, "Reflection" means a number of calculating a light reflection, and "Refraction" means a number of calculating a light transmission refraction.

In the example of FIG. 14, a parameter in the "−" direction is only BackFaceCull. However, in actual practice, there are also other parameters that work to the "−" direction, such as, for example, Collapse that shows a deletion flag from the memory of shape information, and Visible that shows a display/non-display flag of shape information.

Further, at step S202, the status monitoring program 101 sets the correction parameter table 1500 as shown in FIG. 15. The correction parameter table 1500 is a second reference table for finally determining a parameter that causes an abnormal processing, and this table is generated for each rendering identifier 1101. "Parameters" 1501 are the same as the parameters 1401 that are set in the parameter calculation time relation table 1400. Based on the rendering information record file 1104, a "current value" 1502 of each parameter is written. For other data items, when a decision has been made that a processing that has just been started will not produce a desirable execution result, values are sequentially written into these items at the step of selecting candidate correction parameters. This process will be explained later with reference to a processing flow shown in FIG. 4.

After finishing the above initial value setting processing at step S202, the status monitoring program 101 waits for receiving output signals of rendering processing from the rendering apparatuses 110 to 112.

After the status monitoring program 101 has received output signals from the rendering apparatuses 110 to 112 at step S203, the status monitoring program 101 decides the contents of the output signals at step S204. When the output signal shows a completion of the preparation of one frame, the status monitoring program 101 carries out the processing at step S205 afterward. When the output signal does not show a completion of the preparation of one frame, the status monitoring program 101 returns to step S203, and waits for the next output signal.

At step S205, the status monitoring program 101 adds the processing contents of the frame (the information of "Now rendering" afterward in FIG. 5), to the "rendering information record file" 1104 of the "rendering identifier" 1101 based on the output signal. Further, the status monitoring program 101 records the processing time into the "rendering time" 1202 of the "frame" 1201 of the processing time table 1200, based on the added information ("Now rendering", and "Latest time" in FIG. 5).

At step S206, the status monitoring program 101 refers to the rendering information table 1100 to search for other record that has the same rendering file name 1103 that is recorded in the record of the rendering identifier 1101 corresponding to this output signal, and decides whether the reference flag 1106 of this record is valid or not (that is, whether "1" or not in FIG. 11). When this reference data exists, the status monitoring program 101 processes the step at S207. When this reference data does not exist, the status monitoring program 101 carries out the processing at step S210 afterward.

At step S207, the status monitoring program 101 decides whether or not the current calculation time of the rendering processing is abnormal as compared with the reference data, by using the processing time table 1200 and the calculation time decision table 1300. This decision method will be explained in detail later with reference to a rendering processing abnormal decision processing flow shown in FIG. 3. When it has been decided that the current rendering calculation time transition is abnormal, the status monitoring program 101 executes the processing at step S208. When it has been decided that the current rendering calculation time transition is not abnormal, the status monitoring program 101 executes the processing at step S210 afterward.

At step S208, the status monitoring program 101 selects a parameter that becomes the cause of abnormal calculation processing that has been recognized as abnormal, based on the parameter calculation time relation table 1400 and the correction parameter table 1500. This selection method will be explained in detail later with reference to the correction parameter selection processing flow shown in FIG. 4.

At step S209, the status monitoring program 101 prepares abnormal-processing alarm mail information as shown in FIG. 8 for the user 1102 who has requested this abnormal processing, outputs this mail information to the electronic mail program 103, and instructs this program to transmit an electronic mail to this user.

The abnormal-processing alarm mail shows the following items in the example of FIG. 8. Based on the contents of the rendering information record file 1104 corresponding to the rendering identifier 1101 of this abnormal processing, the abnormal-processing alarm mail displays the rendering identifier 1101, the apparatus that is carrying out the rendering processing (rendering ID [013] on [Host-A]) in the example shown in FIG. 8, and the frame number of the frame that has been decided to be the abnormal processing ("frame [123]"). Based on the contents of the correction parameter table 1500, the abnormal-processing alarm mail displays the parameters and the values updated in the processing this time from the latest reference processing (from "Resolution X" to "Reflection"), the parameter name of the parameter that has become the main cause of the abnormal processing ("MotionBlurLevel"), and other parameters that have brought about the abnormal processing, in the order of high influence levels (the parameter names after "And, you better check"). The electronic mail program 103 specifies the mail address of the user 1102 based on the user information recorded in the electronic mail DB 104.

At step S210, the status monitoring program 101 inquires the electronic mail program 103 whether or not there exists a status confirmation mail as shown in FIG. 6 that seeks confirmation of a rendering processing status from the user. This decision is identified based on, for example, whether or not a specific title ("CHK RND STAT" in the Sub column in the example shown in FIG. 6) that shows a status confirmation has been attached to the electronic mail from the user.

The status confirmation mail contains a user name (the USR column in FIG. 6) a password (the PSWD column), a rendering identifier (the RENDERING ID column), and, when necessary, a return destination address (the RTNID column), and identification information that shows whether or not the user wants the attachment of a rendering image file completed up to the present at the time of returning the mail (when there is a description of "attach" in the FILE column, this shows that the user wants the attachment). When a status confirmation mail exists, the status monitoring program 101 proceeds to the processing at step S211, and transmits a status notification mail. When a status confirmation mail does not exist, the status monitoring program 101 executes the processing at step S212.

In the status notification mail transmission processing at step S211, the status monitoring program 101 specifies the information record file 1104 of the corresponding rendering identifier 1101 based on the status confirmation mail, extracts portions recorded at the time when the rendering processing was started (rows attached with a ">" mark at the header) and information added at the time of the latest completion frame, based on the contents of the file, and prepares status notification mail information as shown in FIG. 7. Further, when the user wants the attachment of the rendering image file of the current status, the status monitoring program 101 specifies the file by referring to the rendering image file name 1105, and adds the mail information that the file will be attached ("File (attached"). Then, the status monitoring program 101 transmits the status notification mail information and the image file to the electronic mail program 103, and, at the same time, instructs the electronic mail program 103 to transmit an electronic mail to the user. The electronic mail program 103 transmits the status notification mail to a registered mail address of the user, or to the mail address specified in the status confirmation mail.

It may be arranged such that the status monitoring program 101 does not execute the processing at steps S210 and S211, and instead, the electronic mail program 103 refers to the rendering information table 1100 as soon as the status confirmation mail has been received from the user, and executes the processing similar to that of steps S210 and S211.

At step S212, the status monitoring program 101 decides whether the frame processing completion information that has just been written into the rendering information record file 1104 is the information for the last frame or not, by referring to the item "Now rendering" of the information record file shown in FIG. 5. When the last frame has been completed, the status monitoring program 101 executes the processing at step S213. When the written information is not for the last frame, the status monitoring program 101 returns to step S203, and waits for the next rendering output signal.

At step S213, the status monitoring program 101 prepares the end notification mail information based on the information of the rendering information record file 1104 at the point of time when the rendering processing of the rendering identifier 1101 has been finished up to the last frame. At the same time, the status monitoring program 101 specifies the completed rendering image file 1105, transmits this file to the electronic mail program 103, and also instructs the electronic mail program 103 to transmit a mail to the user 1102. Although the end notification mail is not shown in the drawing, this mail may have the same contents and structure as those of the status notification mail shown in FIG. 7. The mail may not have the same contents and structure, if the user can recognize the end of the processing. The user can set in advance whether the user wants the attachment of the completed image file or not.

Next, at step S214, the status monitoring program 101 receives information that the electronic mail program 103 has received the information from the user that the user has received a reference designation mail. Then, at step S215, the status monitoring program 101 changes the reference flag 1106 of the corresponding rendering identifier 1101 to valid "1", and finishes the series of processing. The reference designation mail has substantially the same structure as that of the status confirmation mail shown in FIG. 6. However, the user transmits this reference designation mail using a specific title (for example, "MARK REF" in the Sub column) to enable the electronic mail program 103 to recognize this mail. This mail does not contain such information as a return destination address and presence or absence of an attached image file.

If the user has not transmitted the reference designation file, the series of processing ends there.

In this case, it may be arranged such that, instead of the status monitoring program 101 executing the processing at steps S214 and S215, the electronic mail program 103 executes a processing similar to that at step S215 to the rendering information table 1100, at the point of time when the electronic mail program 103 has received the reference designation mail from the user. Further, it may be arranged such that when the user has received the end notification mail, the user returns the reference designation mail without fail, and the electronic mail program 103 or the status monitoring program 101 decides the information contents of reference designation possible or impossible that is contained in this reference designation mail. When the reference designation is possible, the electronic mail program 103 or the status monitoring program 101 may set the reference flag. For example, when the information of "REF: OK" is contained in the electronic mail, a decision is made that the reference designation is possible, and when the information of "REF: OFF" is contained in the electronic mail, a decision is made that the reference designation is not possible.

The processing flowchart shown in FIG. 2 is described as a status monitoring processing flow that is closed to a certain specific rendering identifier. Accordingly, in the actual system operation, after finishing the processing at step S215, the process returns to step S201 or S203 again, and a start signal of a new rendering identifier and an output signal of an existing rendering identifier are awaited.

Figure 3:
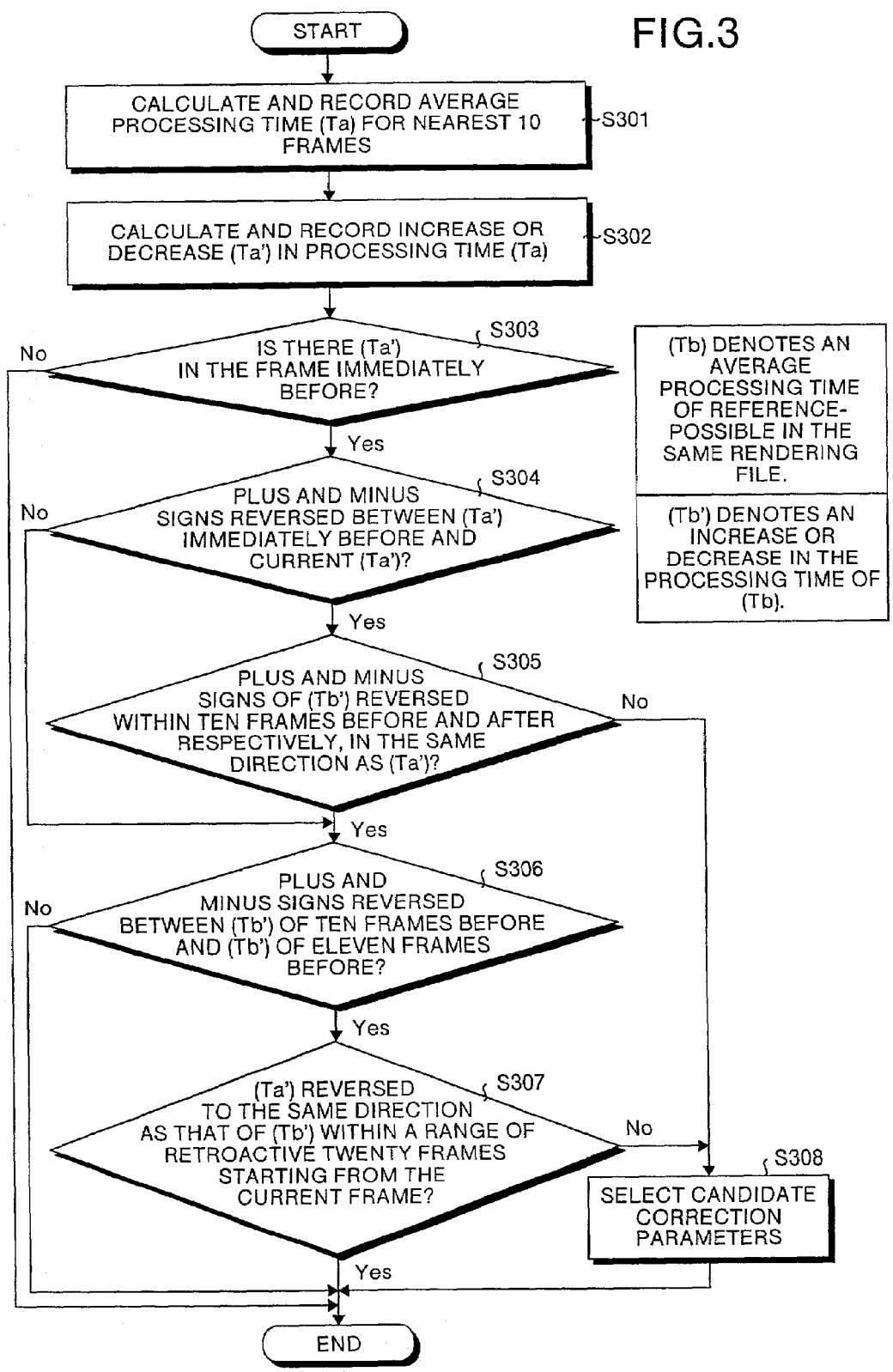
FIG. 3 is a processing flowchart for making a decision of an abnormal rendering processing according to the present invention.

FIG. 3 shows a processing flow of a decision about an abnormal rendering processing that is executed by the status monitoring program 101 (the processing at step S207 in FIG. 1). The decision processing is carried out as follows. The current transition status is compared with the reference calculation time transition status that has been generated based on the processing time table 1200 that corresponds to the past processing that has been reference designated by the user in the processing of the same rendering file 1103. Based on this comparison, it is confirmed whether or not a change in the direction of increasing or decreasing the processing time becomes a change in the same direction within the constant frame range.

The calculation time decision table 1300 is used for the decision processing. In the processing at step S202 in FIG. 1, the average processing time 1302 and the increase or decrease in the processing time 1303 for each frame have already been recorded, based on the processing calculation time table 1200 of all the rendering identifiers 1101 that have been referred to in the processing of the same rendering file 1103.

At step S301, the status monitoring program 101 calculates and records the average value (Ta) 1304 of each processing time for ten retroactive frames starting from the current completed latest frame (for example, from the eleventh frame to the twentieth frame, when the latest completed frame is the twentieth frame), based on the processing time table 1200 corresponding to the rendering identifier 1101. In this case, values are not recorded for the first frame to the ninth frame, because it is not possible to calculate the average values for these frames due to the lack of the prescribed number of frames.

Next, at step S302, the status monitoring program 101 calculates and records an "increase or decrease in the calculation processing time" (Ta') 1305 for the above ten-frame range. In this case, values are not recorded for the first frame to the ninth frame, because it is not possible to calculate the average values for these frames due to the lack of the prescribed number of frames.

Next, at step S303, the status monitoring program 101 decides whether or not there is an increase or decrease in the calculation processing time (Ta') 1305 of the current processing in the frame immediately before. In other words, the status monitoring program 101 decides whether or not the latest processing completion frame is the eleventh frame afterward. If the latest processing completion frame is the eleventh frame afterward, the status monitoring program 101 proceeds to the processing at step S304. If the latest processing completion frame is not the eleventh frame afterward, it is not possible to decide the processing time, and therefore, the status monitoring program 101 finishes the series of processing.

At step S304, the status monitoring program 101 decides whether or not the plus and minus signs of the increase or decrease in the processing time 1305 are reversed between the latest processing completion frame and the frame immediately before. In other words, the status monitoring program 101 decides whether or not peaks and bottoms are generated in the graph at the time of the calculation. When the plus and minus signs are reversed, the status monitoring program 101 identifies whether the reversal is in a direction from increase to decrease (the peak in the expression of the graph) or the reversal is in a direction from decrease to increase (the bottom in the expression of the graph) Then, the status monitoring program 101 proceeds to the processing at step S305. When the plus and minus signs are not reversed, the status monitoring program 101 proceeds to the processing at step S306.

At step S305, a reversal has been detected in the increase or decrease of calculation time at the point of time of the latest completion frame. Therefore, the status monitoring program 101 also decides whether there exists the reversal of the same direction as that detected at step S304 in the increase or decrease in the processing time 1303 of the reference calculation time transition, based on the past data for ten frames, with the latest processing completion frame as a center (for example, the eleventh frame to the thirtieth frame, when the latest completion frame is the twentieth frame). When a reversal in the same direction also exists in the reference calculation time transition within the prescribed range of frames, the status monitoring program 101 proceeds to the processing at step S306. When a reversal in the same direction does not exists in the reference calculation time transition within the prescribed range of frames, or when a reversal exists but the reversal direction does not coincide with the direction detected at step S304, the status monitoring program 101 decides that the processing currently executed is abnormal. Then, the status monitoring program 101 proceeds to the candidate correction parameter selection processing at step S308 (the processing flow in FIG. 4).

When the abnormal processing has not been recognized in the processing at steps S303 and S305, the status monitoring program 101 next decides at step S306 whether or not there exists a reversal between the plus and minus signs in the increase or decrease in the processing time 1303 of the reference calculation time transition in the tenth frame before and the eleventh frame before the current latest completion frame (for example, the tenth frame and the ninth frame, when the twentieth frame is the latest completion frame). When a reversal exists, the status monitoring program 101 identifies a plus or minus reversal direction, and then proceeds to the processing at step S307. When there exists no reversal, the status monitoring program 101 decides that there is no abnormal condition in the current processing status, and finishes the series of processing.

At step S307, the status monitoring program 101 decides whether or not there exists a reversal in the same direction as that detected in the reference calculation time transition at step S306 within a range of retroactive twenty frames starting from the latest completion frame of the calculation time transition of the current processing (for example, from the first frame to the twentieth frame, when the twentieth frame is the latest completion frame). When there also exists a reversal in the same direction within the above range in the calculation time transition of the current processing, the status monitoring program 101 decides that there is no abnormal condition in the current processing progress status, and finishes the series of processing. However, when a reversal does not exist or when a reversal in a different direction exists, the status monitoring program 101 decides that there is an abnormal condition in the current processing progress status. Then, the status monitoring program 101 executes the candidate correction parameter selection processing at step S308 (the processing flow in FIG. 4).

The reason why the decision processing at steps S306 and S307 is carried out based on the reference calculation time transition as a starting point, not only the decision processing at steps S303 and S305 is carried out based on the current processing calculation time transition as a starting point, will be explained with reference to conceptual diagrams shown in FIG. 10.

In order to give an alarm by monitoring a transition of the calculation time, the increase or decrease in the processing time (Tb') 1303 of the reference calculation time transition is obtained from a past reference rendering result, and this is compared with the increase or decrease in the processing time (Ta') 1305 of the current rendering calculation. In order to give an alarm based on a change in calculation time, it is necessary to detect the following four patterns.

(Case 1): The increase or decrease in the processing time (Ta') of the current rendering time (Ta) remains +, even when the increase or decrease in the processing time (Tb') of the reference rendering time curve (Tb) has changed "from + to −".

(Case 2): The increase or decrease in the processing time (Tb') of the reference rendering time curve (Tb) remains +, even when the increase or decrease in the processing time (Ta') of the current rendering time (Ta) has changed "from + to −".

(Case 3): The increase or decrease in the processing time (Ta') of the current rendering time (Ta) remains −, even when the increase or decrease in the processing time (Tb') of the reference rendering time curve (Tb) has changed "from − to +".

(Case 4): The increase or decrease in the processing time (Tb') of the reference rendering time curve (Tb) remains −, even when the increase or decrease in the processing time (Ta') of the current rendering time (Ta) has changed "from − to +".

At steps S303 to S305, the decisions of the (case 2) and the (case 4) are made for the case where there has been a change in the increase or decrease in the current rendering time. On the other hand, when there has been an increase or decrease in the average rendering processing time, even when there has been no change in the increase or decrease in the current rendering time, it is expected that there is an increase or decrease in the current rendering time. Therefore, it is necessary to make decision for the (case 1) and the (case 3). The decisions are made in the processing at steps S306 and S307.

In this case, a deviation occurs in the decision range for the following reasons. For example, it is assumed that the thirtieth frame is the latest completion frame of the rendering processing currently in progress. For comparing the current calculation time transition with the reference calculation time transition, the range of the reference time transition is ten frames with the current thirtieth frame as the center, that is, the twentieth frame to the fortieth frame. On the other hand, for comparing the increase or decrease in the reference calculation time transition with the current calculation time transition, as the data exists only up to the thirtieth frame, the range of data of twenty frames that the current time transition can take becomes the eleventh frame to the thirtieth frame. Accordingly, the base point data of the reference calculation time transition becomes the twentieth frame that is the center frame.

Figure 4:
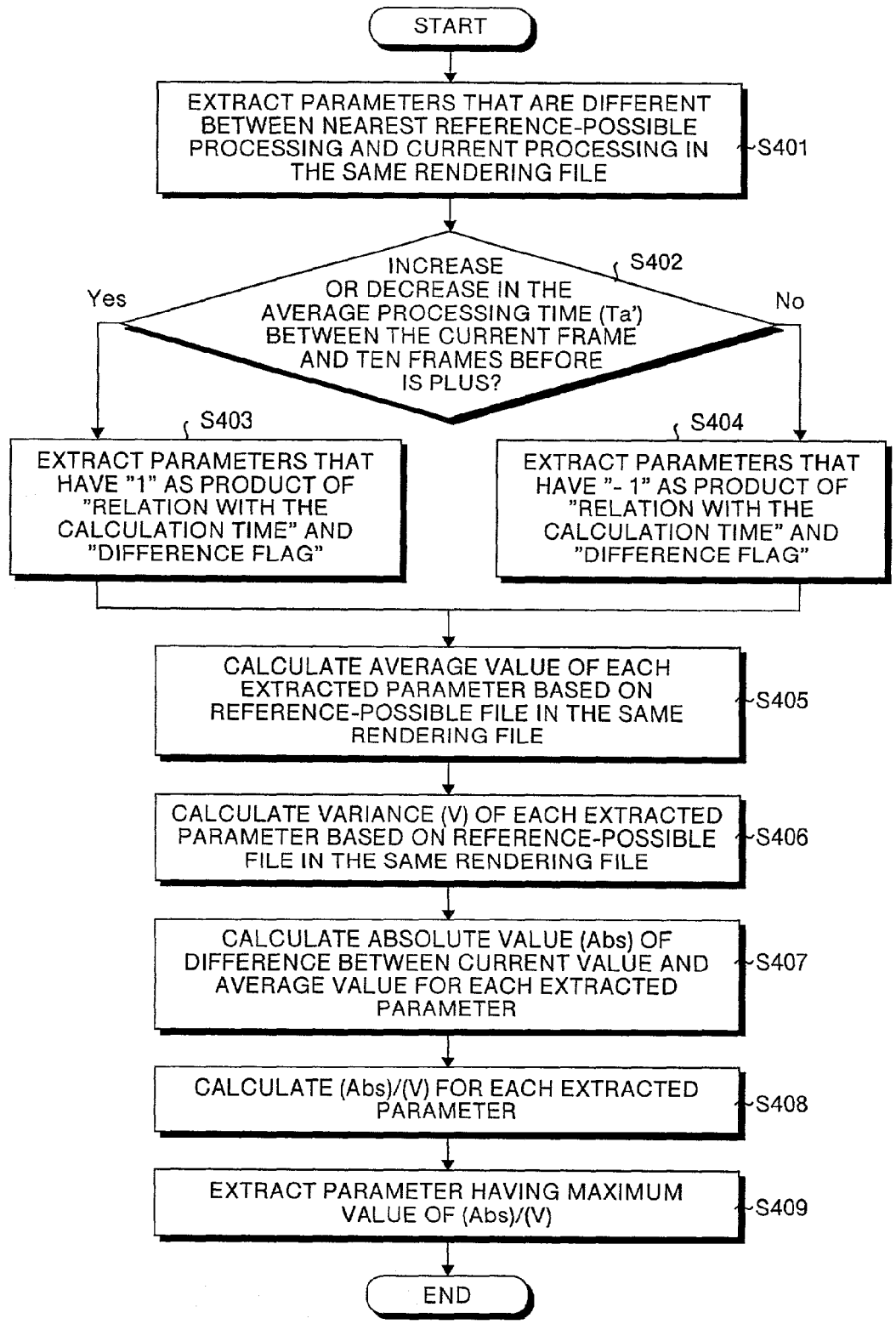
FIG. 4 is a processing flowchart for selecting candidate correction parameters according to the present invention.

FIG. 4 shows a processing flow of the candidate correction parameter selection that is carried out by the status monitoring program 101 (the processing at step S208 in FIG. 2). The parameter calculation time relation table 1400 and the correction parameter table 1500 are used in this processing flow. For the parameter calculation time relation table 1400, all the values have already been set in the processing at step S202 in FIG. 2. Similarly, the current value 1502 has already been recorded in the correction parameter table 1500.

First, at step S401, the status monitoring program 101 refers to the rendering information record file 1104 corresponding to the nearest rendering identifier 1101 having a valid ("1") reference flag 1106 for the processing of the same rendering file 1103, and writes the set value of each parameter into a "nearest value" 1503 (in the example shown in FIG. 11, when the rendering identifier of the current processing is "013", for example, the nearest reference rendering identifier becomes "008"). Further, the status monitoring program 101 compares the "current value" 1502 with the "nearest value" 1503, and sets a "difference flag" 1504. In the setting of the difference flag 1504, a decision is made whether the value is the same or not, and at the same time, a decision on increase or decrease is also made. When the value has increased, "1" is set, and when the value has decreased, "−1" is set, and when there has been no increase or decrease, "0" is set. Then, the status monitoring program 101 extracts parameters of which set values have been changed, by referring to the difference flag 1504, and records this parameters into the work memory.

In the example of FIG. 15, flags other than "0" in the difference flag 1504 show that there is a difference between the two values, and therefore, the set value has been changed in the processing this time. Accordingly, the parameters extracted at step S401 become all the parameters other than Refraction.

Next, at step S402, the status monitoring program 101 decides plus or minus of the value of the "increase or decrease in the processing time" (Ta') 1305 of the latest processing completion frame in the calculation time decision table 1300. When the increase or decrease in the processing time (Ta') 1305 is plus, the status monitoring program 101 proceeds to the processing at step S403. Then, the status monitoring program 101 further finds parameters for which the product 1505 of the "relation with the calculation time" 1402 and the "difference flag" 1504 becomes "1", by referring to the parameter calculation time relation table 1400. When the increase or decrease in the processing time (Ta') 1305 is negative at step S402, the status monitoring program 101 proceeds to the processing at step S404. Then, the status monitoring program 101 further finds parameters for which a "product" 1505 of the "relation with the calculation time" 1402 and the "difference flag" 1504 becomes "−1", by referring to the parameter calculation time relation table 1400.

The processing at steps S403 and S404 will be additionally explained below with reference to the conceptual diagrams shown in FIG. 10 again.

Figure 10:
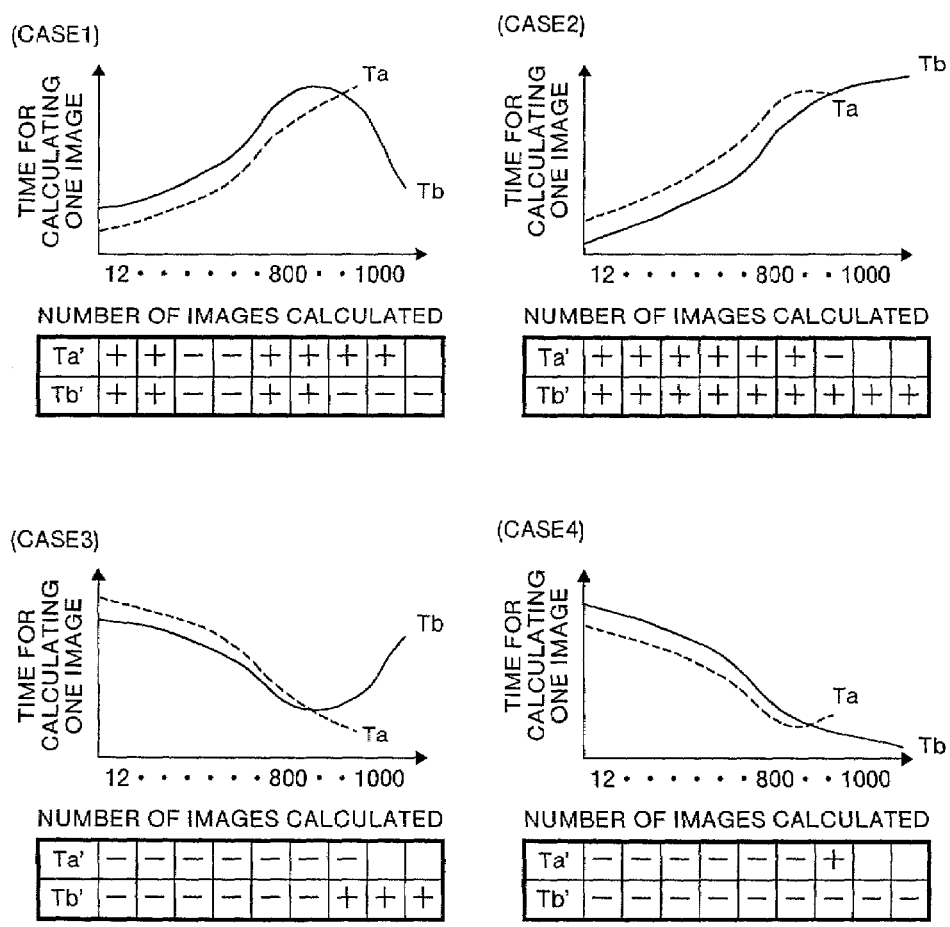
FIG. 10 shows conceptual diagrams of calculation time change detection patterns.

In FIG. 10, the case 1 and the case 4 are the cases where an alarm is given, as the total calculation time becomes longer because of an inappropriate setting of parameters. Therefore, in this case, in the processing at step S403, the parameters that have been changed to a direction of increasing the calculation time are extracted. On the other hand, the case 2 and the case 3 are the cases where an alarm is given, as the total calculation time becomes shorter. Therefore, in this case, in the processing at step S404, the parameters that have been changed to a direction of decreasing the calculation time are extracted.

In the above, the "product" 1505 of the "relation with the calculation time" 1402 and the "difference flag" 1504 is used to make decision for the following purpose. Namely, when it has been decided that the calculation time increases at step S402, the product is used to extract both a case where the parameter of which calculation time increases when the set value becomes larger at step S403, or the set value of the parameter having "1" in the "relation with the calculation time" 1402 is made larger, and a case where the parameter of which calculation time decreases when the set value becomes larger, or the set value of the parameter having "−1" in the "relation with the calculation time" 1402 is made smaller.

On the other hand, at step S404, when it has been decided that the calculation time decreases at step S402, the product is used to extract both a case where the set value of the parameter having "1" in the "relation with the calculation time" 1402 is made smaller, and a case where the set value of the parameter having "−1" in the "relation with the calculation time" 1402 is made larger.

In the examples of FIG. 14 and FIG. 15, SubDivisionLevel and ShadowLevel are not selected as candidates among the parameters that have been extracted at step S401. In this case, BackFaceCull that has "−1" in the "difference flag" 1106 is selected as a candidate, because this parameter has "−1" in the "relation with the calculation time" 1402, and has "1" in the "product" 1505 as a result.

Next, at step S405, the status monitoring program 101 calculates and records an "average value" 1506 of the parameter set values, based on the rendering information record file 1104 corresponding to all the rendering identifiers 1101 of the processing of the same rendering file 1103 having a valid reference flag 1106 ("1" in this example), for the parameters that have been extracted in the processing at step S403 or S404.

Further, at step S406, in a similar process, the status monitoring program 101 calculates and records a "variance" 1507 of the parameter set values.

Next, at step S407, the status monitoring program 101 calculates an "absolute value" 1508 of a difference between the "current value" 1502 and the "average value" 1506, for the parameters that have been extracted in the processing at step S403 or S404.

Next, at step S408, the status monitoring program 101 writes a value 1509 obtained by dividing the "absolute value of the difference" 1508 by the "variance" 1507, for the parameters that have been extracted in the processing at step S403 or S404.

Finally, at step S409, the status monitoring program 101 specifies a parameter having a largest value in the "absolute value of the difference/variance" 1509 among the candidate correction parameters selected at step S403 or S404, as a parameter to be corrected.

In the above, the variance is used for the following reason. For example, assume a case where 30 parameters have been changed for which a variation within a range of 50 on average is permitted, and a case where 10 parameters have been changed for which a variation within a range of 5 is permitted. In this case, an absolute value of the changes is larger in the former case. However, it is anticipated that the latter case gives a larger influence to the calculation time.

As a result of the processing at step S409, the status monitoring program 101 finally selects MotionBlurLevel.

At step S409, instead of the status monitoring program 101 extracting only the parameter having the largest "absolute value of the difference/variance" 1509, the status monitoring program 101 may sort the "absolute value of the difference/variance" 1509 in the order of large values. With this arrangement, it becomes possible to notify all the parameters extracted at step S403 or S404 to the user in the order of high influence levels. In the example of the abnormal-processing alarm mail shown in FIG. 8, a result of carrying out the above processing is reflected.

As hardware that constitute the rendering processing status monitoring apparatus, there are provided a CPU, a ROM, a RAM, an HDD (hard disk drive), an HD (hard disk), an FDD (floppy disk drive), an FD (floppy disk) as one example of a detachable recording medium, a display, an I/F (interface), a keyboard, and a mouse. These constituent elements are connected via a bus.

The CPU executes the control of the rendering processing status monitoring apparatus as a whole. The ROM stores programs such as a boot program. The RAM is used as a CPU work area.

The HDD controls the reading/writing of data from/to the HD according to the control of the CPU. The HD stores the data written under the control of the HDD.

The FDD controls the reading/writing of data from/to the FD according to the control of the CPU. The FD stores the data written under the control of the FDD, and the data stored in the FD is read by the information processing unit. As a detachable recording medium, there may be used a CD-ROM (a CD-R, a CD-RW), an MO, a DVD (digital versatile disk), or a memory card, in addition to the FD. The display is for displaying a cursor, icons, toolboxes, and windows (browsers) according to data like documents, images, and functional information. The display includes a CRT, a TFT liquid crystal display, a plasma display, and the like.

The CPU executes the status monitoring program 101, and the electronic mail program 103 that are stored in the ROM, the RAM, the HD, and the FD, thereby to realize their functions.

A part of various data and data tables stored in the processing status DB 102 and the electronic mail DB 104 is generated and erased according to the needs of the RAM that is used as a work area.

The I/F (interface) is connected to a network like the LAN and the Internet via the communication lines, and is also connected to other information processing units (like servers) via the network. Then, the I/F works as an interface between the network and the inside, and controls data input/output to/from other servers and information terminal units. The I/F is a modem, for example. When an information-providing unit carries out radio communications with a portable telephone or the like, the I/F has a function of a communication unit (a radio transceiver).

The keyboard has keys for inputting characters, numbers, and various kinds of instructions, and is used to input data. The keyboard may be a touch-panel type input pad. The mouse is used for moving the cursor, selecting a range, moving the windows, changing sizes, etc. The mouse may be a trackball or a joystick that has functions as a pointing device.

As explained above, in the rendering calculation processing status monitoring program, the storage medium, the apparatus, and the method according to the present invention, it is possible to forecast whether a processing executed by a computer can output a desirable execution result or not, and notify this forecast to a user, during the execution of the processing.

Further, in the rendering calculation processing status monitoring program, the storage medium, the apparatus, and the method according to the present invention, it is possible to identify a necessary correction point and notify this to a user, when it has been forecast that a rendering calculation processing currently under execution is not possible to produce a desirable execution result.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer-readable recording medium storing a computer readable program to be executed by a computer for monitoring a processing status of a user-requested job of a rendering calculation processing, wherein the program comprises:
   storing information on the rendering calculation processing of a rendering file that is performed with varying a plurality of parameters, the information including influencing characteristics that each parameter gives influence to the job on a processing transition of a processing example that is desirable for the user;
   obtaining influencing characteristics that each parameter gives influence to the job on a processing transition of a current rendering processing;
   comparing the thus obtained influencing characteristics on the processing transition with the influence characteristics on the processing transition of the processing example for each parameter;
   deciding whether the job is a processing suitable for the user during the execution of the job processing based on a predetermined rule; and
   notifying to the user that the job is not a suitable processing, when the job is decided not to be a processing suitable for the user;
   wherein when the job has been decided as not suitable, a difference in the influencing characteristics of each parameter between the current rendering processing and the processing example is determined, and a parameter set with a greatest difference in value of the influencing characteristics is specified as a candidate parameter for correcting a set value,
   wherein the influencing characteristics include an average processing time for processing a predetermined number of frames for each parameter,
   wherein the influencing characteristics include whether there is an increase or a decrease in the processing time of each frame with respect to a processing time of an immediately preceding frame, for each parameter, and
   wherein the user specifies the processing example that is desirable for the user, from among jobs that have been executed in the past.

2. The computer-readable recording medium according to claim 1, wherein at the time of comparing the job with the processing example that is desirable for the user, a reference case is prepared based on a plurality of the previously storedcases, and the job to be decided is compared with this reference case.

3. The computer-readable recording medium according to claim 1, wherein when the monitoring unit has specified the candidate parameter, the notification unit notifies the candidate parameter to the user.

4. The computer-readable recording medium according to claim 1, wherein the influence characteristic are ratios of absolute values of differences between a current value and an average value to variance.

5. A rendering calculation processing status monitoring apparatus for monitoring a processing status of a user-requested job of a rendering calculation processing for processing a plurality of frames, the apparatus comprising:
   a storing unit which stores information on the rendering calculation processing of a rendering file that is performed with varying a plurality of parameters, the information including influence characteristics that each parameter gives to the job on a processing transition of a processing example that is desirable for the user;

a monitoring unit which obtains influencing characteristics that each parameter gives influence to the job on a processing transition of a current rendering processing and compares the thus obtained influencing characteristics on the processing transition with the influence characteristics on the processing transition of the processing example for each parameter to determine whether the job is a processing suitable for the user during the execution of the job processing based on a predetermined rule stored in the storing unit; and a notification unit which notifies to the user that the job is a processing that is not suitable for a user, when the monitoring unit has made this decision, wherein when the job has been decided as not desirable, the monitoring unit determines a difference in the influencing characteristics of each parameter between the current rendering processing and the processing example, and specifies a parameter set with a greatest difference in value of the influencing characteristics as a candidate parameter for correcting a set value, wherein the influencing characteristics include an average processing time for processing a predetermined number of frames for each parameter, wherein the influencing characteristics include whether there is an increase or a decrease in the processing time of each frame with respect to a processing time of an immediately preceding frame, for each parameter, and wherein the user specifies the processing example that is desirable for the user, from among jobs that have been executed in the past.

6. The rendering calculation processing status monitoring apparatus according to claim 5, wherein when the monitoring unit has specified the candidate parameter, the notification unit notifies the candidate parameter to the user.

7. A method of monitoring a rendering calculation process performed with respect to a job, comprising:
acquiring first characteristics relating to the rendering calculation process being carried out;
determining whether the first characteristics match with second characteristics;
outputting a notification, when it is determined at the determining that the first characteristics do not match with the second characteristics;
accumulating a plurality of first characteristics of previously performed rendering calculation processes on other jobs; and
setting the second characteristics based on the first characteristics accumulated at the accumulating, said setting including a user selecting first characteristics from among the plurality of first characteristics as the second characteristics,
wherein the job includes a plurality of frames, the rendering calculation process is performed frame by frame, and each of the first characteristics and the second characteristics includes at least one of an average processing time required to perform the rendering calculation process on a plurality of frames and a processing time required to perform the rendering calculation process on adjacent frames.

8. The method according to claim 7, wherein the outputting includes sending an electronic message that indicates that the first characteristics do not match with the second characteristics to a registered address.

9. The method according to claim 7, wherein the rendering calculation process is performed based on at least one variable parameter, and the method further comprising:
identifying a cause parameter, when it is determined at the determining that the first characteristics do not match with the second characteristics, which is a parameter that is a cause for not matching of the first characteristics with the second characteristics; and
outputting the cause parameter.

10. The method according to claim 9, wherein the outputting includes sending an electronic message that indicates that the cause parameter is a cause for not matching of the first characteristics with the second characteristics to a registered address.

11. The method according to claim 9, wherein the job includes plurality of frames, the rendering calculation process is performed frame by frame, each of the first characteristics and the second characteristics relate to a rendering calculation process corresponding to each frame for each parameter, and the identifying includes
monitoring the first characteristics relating to the rendering calculation process corresponding to each frame for each parameter; and
selecting a parameter that causes the first characteristics to not change in a predetermined manner based on a result of the monitoring; and
outputting the parameter selected at the selecting as the cause parameter.

12. The method according to claim 11, wherein the outputting includes sending an electronic message that indicates that the cause parameter is a cause for not matching of the first characteristics with the second characteristics to a registered address.

13. The method according to claim 8, further comprising:
calculating a value of the cause parameter that will cause the first characteristics to change in a predetermined manner; and
outputting the value.

14. The method according to claim 13, wherein the outputting includes sending an electronic message to a registered address that indicates that the first characteristics will match with the second characteristics if the cause parameter is set to the value.

* * * * *

UNITED STATES PATENT AND TRADEMARK OFFICE
CERTIFICATE OF CORRECTION

| | | |
|---|---|---|
| PATENT NO. | : 7,103,658 B2 | Page 1 of 1 |
| APPLICATION NO. | : 10/029801 | |
| DATED | : September 5, 2006 | |
| INVENTOR(S) | : Tetsuhiko Awaji | |

It is certified that error appears in the above-identified patent and that said Letters Patent is hereby corrected as shown below:

Column 16, Line 47, change "storedcases," to --stored cases,--.

Signed and Sealed this

Thirtieth Day of January, 2007

JON W. DUDAS
*Director of the United States Patent and Trademark Office*